United States Patent
Parks et al.

(10) Patent No.: US 6,235,138 B1
(45) Date of Patent: May 22, 2001

(54) POLYURETHANE FOAM/PVC LAMINATE FOR AUTOMOTIVE INSTRUMENT PANELS

(76) Inventors: Kristen L. Parks; Charles M. Milliren, both of Bayer Corporation 100 Bayer Rd., Pittsburgh, PA (US) 15205-9741

( * ) Notice: Subject to any disclaimer, the term of this patent is extended or adjusted under 35 U.S.C. 154(b) by 0 days.

(21) Appl. No.: 09/301,675

(22) Filed: Apr. 28, 1999

(51) Int. Cl.[7] .............................. B32B 5/18; B32B 31/20; B32B 27/40
(52) U.S. Cl. ..................... 156/214; 156/212; 156/222; 156/224; 156/255; 156/256
(58) Field of Search .............................. 156/77, 78, 212, 156/214, 221, 222, 224, 303.1, 250, 255, 256

(56) References Cited

U.S. PATENT DOCUMENTS

| | | | |
|---|---|---|---|
| 4,243,617 | * 1/1981 | Burge | 264/39 |
| 4,504,536 | 3/1985 | Wong . | |
| 4,769,278 | * 9/1988 | Kamimura et al. | 428/282 |
| 4,902,362 | * 2/1990 | Stewart et al. | 156/79 |
| 4,910,067 | 3/1990 | O'Neill . | |
| 4,941,936 | * 7/1990 | Wilkinson et al. | 156/274.8 |
| 5,256,236 | * 10/1993 | Woller | 156/290 |
| 5,372,379 | * 12/1994 | Parker | 280/728 B |
| 5,380,785 | 1/1995 | Ngoc et al. . | |
| 5,395,580 | 3/1995 | Morita et al. . | |
| 5,407,225 | 4/1995 | Cooper . | |
| 5,409,649 | * 4/1995 | Pool | 264/51 |
| 5,415,940 | 5/1995 | Ngoc et al. . | |
| 5,445,208 | 8/1995 | Shaner et al. . | |
| 5,503,927 | 4/1996 | Ragland et al. . | |
| 5,536,351 | * 7/1996 | Rheinlander et al. | 156/212 |
| 5,554,252 | * 9/1996 | Foran | 156/497 |
| 5,565,259 | * 10/1996 | Juriga | 428/138 |
| 5,616,396 | 4/1997 | Ueki et al. . | |
| 5,633,063 | 5/1997 | Lause et al. . | |
| 5,677,048 | 10/1997 | Pushaw . | |
| 5,750,263 | 5/1998 | Ngoc et al. . | |
| 5,759,324 | 6/1998 | Roth et al. . | |
| 5,783,016 | * 7/1998 | Gallagher et al. | 156/214 |
| 5,851,338 | 12/1998 | Pushaw . | |

OTHER PUBLICATIONS

K.L. Parks, P. Gansen, J.R. Gricar & U. Liman, "New Developments in Polyurethane Foam Systems for Automotive Instrument Panels", (date unavailable).

* cited by examiner

*Primary Examiner*—Sam Chuan Yao
(74) *Attorney, Agent, or Firm*—Joseph C. Gil; N. Denise Brown

(57) ABSTRACT

The present invention relates to a process for the production of a polyurethane foam backed instrument panel. This process comprises slicing a free-rise bun of polyurethane foam to form a skived polyurethane foam, bonding the skived foam to a skin material to form a laminate, optionally, rolling the foam/skin laminate, thermoforming the foam/skin laminate into an instrument panel skin, positioning the instrument panel skin into the cavity of a mold, positioning a retainer into the core of the mold, adhering the retainer to the laminate by placing an adhesive film onto the retainer, closing the mold to apply heat and pressure, and removing the resultant instrument panel from the mold. Suitable polyurethane foams for the present invention may be flexible foams or semi-rigid foams. This invention also relates to the polyurethane foam backed instrument panels produced by this process.

8 Claims, No Drawings

POLYURETHANE FOAM/PVC LAMINATE FOR AUTOMOTIVE INSTRUMENT PANELS

BACKGROUND OF THE INVENTION

This invention relates to polyurethane foam/PVC (polyvinyl chloride) laminates for automotive instrument panels, and to a process for the production of these automotive instrument panels.

Automotive instrument panels are typically assessed for commercial applications in terms of their ability to satisfy certain requirements including, for example, colorfastness of the skin material after ageing, adhesion properties, fogging characteristics, physical properties, processability, etc. The use of semi-rigid polyurethane foam systems in automotive instrument panels is discussed in the paper entitled "New Developments in Polyurethane Foam Systems for Automotive Instrument Panels" by K. L. Parks, P. Gansen, J. R. Gricar and U. Liman, Society of the Plastics Industry, Proceedings of the Polyurethanes International Technical Conference and Exposition (1996). This paper describes the typical processes and materials that are used in instrument panel manufacturing. Included are descriptions of new instrument panel polyurethane foam systems with improved ageing performance.

Laminated artificial leather and a method of preparing it are disclosed in U.S. Pat. No. 4,504,536. This polyvinyl chloride (PVC) laminated artificial leather has an unfoamed polymeric resin outer layer, a foamed polyvinyl chloride bottom layer having an abraded outer surface and at least one intermediate layer comprising a fabric free polyvinyl chloride between the facing surfaces of the outer and bottom layers, with the outer layer being embossed on the outer surface to provide a leather appearance.

U.S. Pat. No. 4,769,278 describes resilient multi-layered members comprising a surface skin layer, formed of PVC resin powder in gel form, the outer side; a foam material layer, formed from foamed PVC resin powder, the outer side of which is adhered to the inner side of the surface skin layer; a cushion material layer, the outer side of which is adhered to the under side of the foam material layer; and a stiff core material layer on its inside side, the outer side of which is adhered to the inner side of the cushion material layer.

Thermoplastic foam core, fiber reinforced resin structural composite materials are described by U.S. Pat. No. 4,910,067. These structural composite materials comprise a thermoplastic layer, a layer of fibrous material spaced from the thermoplastic layer and a foam core disposed in the space between the thermoplastic layer and the fibrous material. The layer of fibrous material includes a resin impregnating this material and holding the layer of fibrous material together to form a fiber reinforced resin structure. Boats can be made from these structural composites.

U.S. Pat. Nos. 5,395,580, 5,407,225, 5,445,208 and 5,616,396 describe methods of producing automotive interior components, including door trim, door panels and airbag doors. The automotive interior components of U.S. Pat. No. 5,395,580 are laminated structures comprising a surface skin layer having an attractive appearance and feel, and a rigid core member comprising a synthetic resin. Door trim is one example of the types of automotive interior components which may be prepared from this method.

U.S. Pat. No. 5,407,225 describes an invisible airbag door having a reinforced polyvinyl chloride shell. The invisible door arrangement of the airbag is covered by the decorative instrument panel and comprises a curved substrate or insert that is molded of relatively rigid plastic material and secured in the passenger compartment behind the instrument panel and in front of the canister containing a deflated airbag. The substrate has an integral, rectangular frame which projects inward toward the canister and defines a rectangular opening for deployment of the airbag when inflated. This invisible door arrangement further comprises two similar sheet metal doors that close the opening outlined by the face and cooperate to create an opening through the instrument panel upon deployment of the airbag. The doors are made of one-piece construction and preferably of aluminum. The PVC shell is reinforced with a urethane adhesive coating that is flexible.

U.S. Pat. No. 5,445,208 discloses vinyl door panel sections and a method of making door panel sections, specifically garage door panels. These door panel sections comprise a rectangular door panel section having a front skin, a rear skin, opposing top and bottom portions and first and second sides. The door panel section includes a first sheet member and a second sheet member. The first sheet member is a polyvinylchloride material and has outer and inner surfaces, and top and bottom sections. The second sheet member is a non-metallic material and has outer and inner surfaces, and top and bottom sections. The front skin of the panel is comprised essentially of the first sheet member, and the rear skin of the panel section is comprised essentially of the second sheet member. The rigid foamed core is bonded to the inner surface of the first sheet member and is enclosed between the front and rear skins for unitizing the panel section.

Laminated building panels and a method for their production are disclosed by U.S. Pat. No. 5,633,063. These comprise plastic facing sheets on one or both faces of a rigid foam core with fibrous glass fiber mat material mechanically connecting the facing sheet to the core. The facing sheets are formed of suitable thermoplastic polymers including polyvinyl chloride, polyolefins, polycarbonates, acrylics, etc. These building panels are formed by extruding a molten polymer through an extrusion die to form a polymer layer, positioning the glass fiber mat adjacent to the polymer layer, and compressing the polymer layer and mat together before the polymer layer has solidified so that portions of the glass mat are embedded in the polymer and portions of the mat project from the polymer layer. Embossing rollers can be used to compress and emboss the polymer layer. The assembled facing sheet is solidified by cooling. Inner facing sheets are made in a similar manner, except the glass mats are preferably applied to both sides or faces of the polymer layer so that glass fibers project from both faces of the sheet.

Automotive door trim components comprise a main body integrally combining a resin core member and a surface skin member by a mold press forming process and an attachment member attached to a part of the main body. The attachment member is attached to the main body by way of connecting parts of the resin core member still at least in a semi-molten state due to the mold press forming process. The connecting part eventually solidifies so as to achieve a secure engagement between the resin core member and the attachment member.

U.S. Pat. No. 5,759,324 provides a process for binding a cover to a shaped padding, which specifically comprises polyurethane foam. Seat cushions can be produced by this process. This process comprises arranging a cover in a cold-shaping device and fixing it there by means of a holding frame. Then, an adhesive is placed on the internal walls of the cover and subsequently heated to a high temperature with the surface of the padding intended to cooperate with the internal walls of the cover. The heating is interrupted once a predetermined temperature is reached and the heated foam padding is immediately applied to the internal walls of the cover coated with the adhesive, leading to rapid setting of the adhesive. The cold-shaping device is then opened and the padding with its cover is removed.

Pressure sensitive adhesive laminates and methods of producing these are disclosed by U.S. Pat. No. 5,503,927. These laminates comprise a polymeric layer having an active surface, a coating of a curable urethane primary on the surface and a pressure sensitive adhesive applied to the coated surface. The method of forming these laminates comprises applying to the active surface of the polymeric layer a coating of a curable urethane primer, then applying to the coated surface a layer of pressure sensitive adhesive. Laminates are also formed comprising a polymeric layer and a curable urethane primer comprising casting a liquid polymer on a sheet of curable urethane primer in the form of a film and allowing the polymer to cure to form the polymeric layer on the urethane film or sheet.

U.S. Pat. Nos. 5,380,785, 5,415,940 and 5,750,263 describe low fogging rubbery polymers and their utilization in automotive interiors. These rubbery compounds can be blended with polyvinyl chloride to make leathery compositions having good heat and ultraviolet light resistance, and low fogging characteristics. The automotive panels are comprised of a semi-rigid urethane foam which is supported by a rigid backing, and the semi-rigid foam is covered with a leathery skin.

The primary disadvantage of previously known processes is that it is necessary to mold the polyurethane foam directly onto the retainer and skin materials. Polyurethane foam-backed instrument panels are typically produced by positioning a skin material in the cavity of an IP (instrument panel) tool, positioning the plastic retainer in the core, pouring the polyurethane foam onto the skin, closing the tool, applying heat and pressure, and finally opening the tool to remove the IP pad for assembly. The disadvantage that is inherent in this process is that any foam defects that result from the molding process result in scrapping the skin material, the retainer, and the polyurethane foam. Instrument panels are large parts that are difficult to foam consistently without voids. Processing of these parts is influenced by a myriad of factors including tool temperature (hot and cold spots plus day-to-day variations), seasonal variations including humidity level, and timing of the closing of the mold in relation to the foaming reaction, etc. Foam voids are difficult and expensive to repair. The ability to produce an instrument panel using a skin-backed laminate would provide a method to produce instrument panels without foam defects and therefore, a low-cost manufacturing method.

SUMMARY OF THE INVENTION

This invention relates to polyurethane foam/PVC laminate instrument panels and to a process for the production of these polyurethane foam/PVC laminate instrument panels. These polyurethane foam/PVC laminates provide a low cost alternative to the polyurethane foam/PVC instrument panels produced by the open-pour method previously described. In addition, the polyurethane foam can be made to feel softer than polypropylene foam that may be used for the same purpose and has the capability to provide improved adhesion to the PVC skin material.

The process for the production of a polyurethane foam backed instrument panel comprises the steps of:
A) slicing a free-rise bun of polyurethane foam to form a skived polyurethane foam,
B) bonding the skived polyurethane foam to a skin material to form a laminate,
C) optionally, rolling the foam/skin laminated product formed in B) for storage purposes,
D) thermoforming the foam/skin laminate into an instrument panel skin,
E) positioning the instrument panel skin into the cavity of an instrument panel mold,
F) positioning an instrument panel retainer into the core of the instrument panel mold,
G) adhering the instrument panel retainer to the foam/skin laminate by, for example, placing an adhesive film onto the instrument panel skin or other suitable means,
H) closing the mold to apply heat and pressure, and
I) removing the resultant instrument panel from the mold.

The present invention also relates to the resultant polyurethane foam backed instrument panels produced by the above process.

DETAILED DESCRIPTION OF THE INVENTION

Suitable free-rise buns of polyurethane foams for the present invention include, for example, polyurethane foams that are either semi-rigid or flexible, and may be prepared by the reaction of a suitable di- or poly-isocyanate component with an isocyanate-reactive component in the presence of a suitable blowing agent and one or more catalysts. Suitable di- and/or poly-isocyanates include aromatic isocyanate compounds such as, for example, polymethylene poly (phenyl isocyanate), toluene diisocyanate, naphthylene diisocyanate, etc. Suitable isocyanate-reactive compounds to be used in the present invention include, for example, polyether polyols, polyester polyols, amine-terminated polyether polyols, polythioethers, polyacetals, polycarbonates, etc., which typically contain from 2 to 6 isocyanate-reactive groups of the type known for the production of polyurethanes. Compounds such as these generally are characterized by a molecular weight of from about 62 to about 6,000, preferably from about 2,500 to about 6,000, and more preferably from about 4,000 to about 6,000; and have an OH number of from about 20 to about 2,000, preferably from about 25 to about 2,000, and more preferably from about 28 to about 2,000. Blowing agents which are suitable for the preparation of the free-rise buns of polyurethane foams include, for example, water and/or readily volative organic substances. Some examples of suitable organic blowing agents include compounds such as acetone, ethyl acetate, halogen substituted alkanes such as, for example, methylene chloride, chloroform, ethylidene chloride, vinylidene chloride, monofluorotrichloromethane, chlorodifluoromethane as well as butane, hexane, heptane and diethyl ether. Azo compounds such as azoisobutyric acid nitrile are also suitable.

The free-rise bun of polyurethane foam is sliced by an electric saw to form a skived polyurethane foam. These slices of skived polyurethane foam may vary in thickness from about 5 to about 10 mm.

The skived foam is bonded to a skin material to form a laminate. Bonding can be achieved by applying an adhesive film to the skin material and adhering the skived foam on top of the adhesive film, using heat and pressure in a continuous process such as, for example, a laminator. Some examples of skin materials that the skived polyurethane foam may be bonded to include thermoformable skin materials such as, for example, polyvinyl chloride (PVC), polyurethane, acrylonitrile butadiene styrene (ABS)/PVC alloys, thermoplastic olefins (TPO's), etc. The preferred method of bonding the skived foam to the skin material is by use of a laminator. Polyvinyl chloride is a preferred skin material. Suitable laminates for the process of the present invention must exhibit satisfactory adhesion and be free of defects.

Once the laminate is formed, it is optionally rolled up and stored. In an alternate embodiment, the formed laminate is used immediately and step C) is omitted from the process. In the embodiment where the formed laminate is rolled up and stored, at some later time, the roll of foam/skin laminate is unrolled, cut to the desired length, and thermoformed into an instrument panel skin by placing the skin-side of the laminate onto the cavity of the skin-forming tool. Thermoforming occurs at temperatures of about 90° C. or less, preferably for less than about 1 minute using moderate pressure.

The IP-shaped skin is then placed skin-side down in an IP tool or mold and bonded to the IP retainer. An instrument panel retainer is positioned into the core of the instrument panel mold and is attached to the foam/skin laminate by placing an adhesive film onto the laminate. Suitable adhesive films include, for example, polyurethanes and epoxies. Instrument panel retainers serve to mount the instrument panel to the car frame, and are the structural parts. Retainers are typically made of injection-molded thermoplastics.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The process of the present invention could be practiced by following the example set forth below.

A polyurethane foam free-rise bun is skived to a 10 mm thickness. The foam is then adhered to a PVC sheet using a conventional laminator. The polyurethane foam/PVC laminate is then thermoformed into the shape of a PVC skin. The shaped laminate is then placed into the cavity of an IP tool.

A thermoplastic retainer is then placed into the core of the same IP tool. An adhesive film is then placed on the laminate. The IP tool is then closed. heat and pressure are used to bond the laminate to the retainer. The laminate/retainer assembly is then removed from the mold, inspected and trimmed.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyurethane foam backed instrument panel comprising:

A) slicing a free-rise bun of polyurethane foam to form a skived polyurethane foam, B) bonding the skived polyurethane foam to a skin material to form a laminate, C) optionally, rolling the foam/skin laminated product from B), D) thermoforming the foam/skin laminate into an instrument panel skin, E) positioning the instrument panel skin into the cavity of an instrument panel mold, F) positioning an instrument panel retainer into the core of the instrument panel mold, G) adhering the instrument panel retainer to the foam/skin laminate, H) closing the mold to apply heat and pressure, and I) removing the resultant instrument panel from the mold.

2. The process of claim 1, wherein said polyurethane foam is a semi-rigid foam or a flexible foam.

3. The process of claim 1, wherein said skin material is selected from the group consisting of polyvinyl chloride, polyurethane, acrylonitrile butadiene styrene/polyvinyl chloride alloys and thermoplastic olefins.

4. The process of claim 1, wherein said thermoforming occurs at temperatures of about 90° C. or less for less than about 1 minute under moderate pressure.

5. The process of claim 1, wherein the instrument panel retainer is adhered to the foam/skin laminate by placing an adhesive film onto the instrument panel skin.

6. The process of claim 5, wherein the adhesive film is selected from the group consisting of polyurethane adhesives and epoxy adhesives.

7. The process of claim 1, wherein the skived polyurethane foam has a thickness of from about 5 to about 10 mm.

8. The process of claim 1, wherein the instrument panel retainer comprises an injection-molded thermoplastic.

* * * * *